E. M. SCOTT.
JACK FOR MOTOR DRIVEN VEHICLES.
APPLICATION FILED DEC. 27, 1920.
1,382,250.
Patented June 21, 1921.
3 SHEETS—SHEET 1.
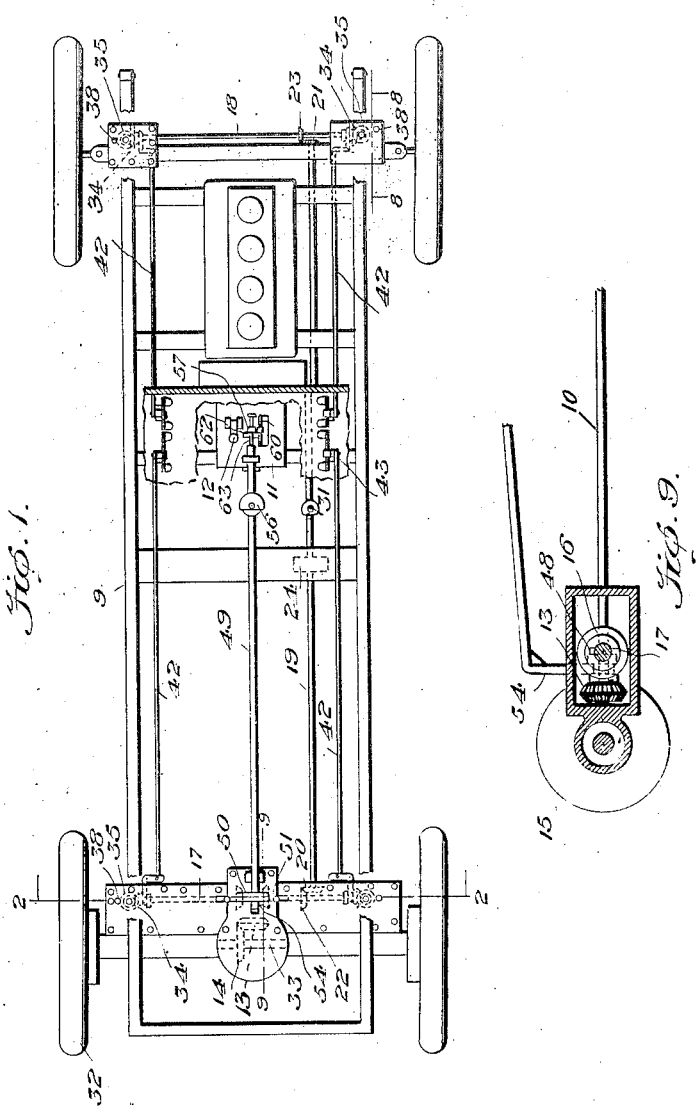

E. M. SCOTT.
JACK FOR MOTOR DRIVEN VEHICLES.
APPLICATION FILED DEC. 27, 1920.
1,382,250.
Patented June 21, 1921.
3 SHEETS—SHEET 2.
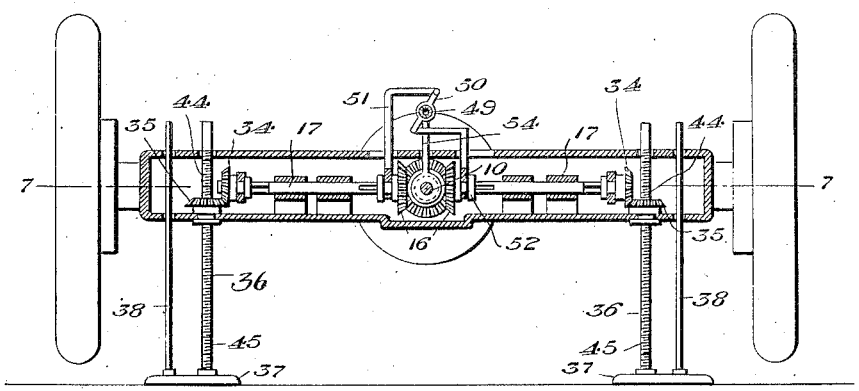
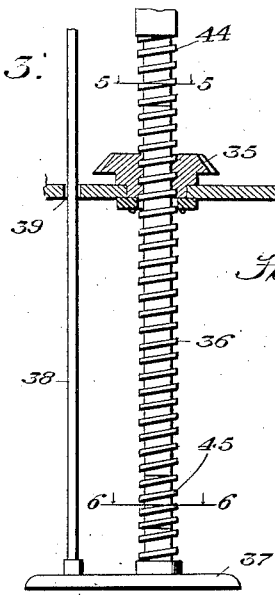
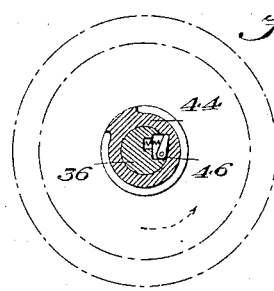
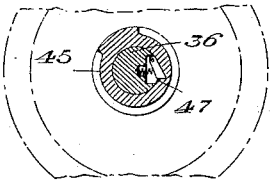
Inventor
Edward M. Scott
Blackwood Bros
Attorneys

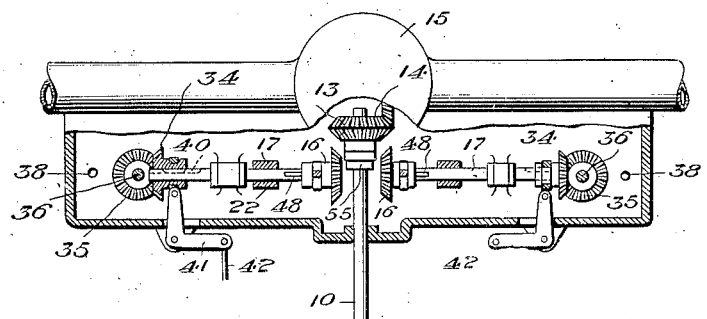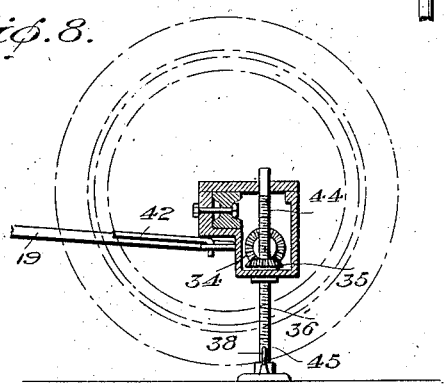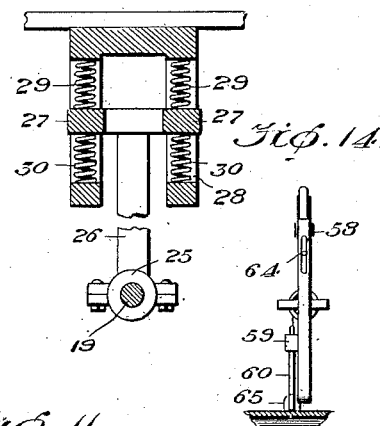

UNITED STATES PATENT OFFICE.

EDWARD M. SCOTT, OF OBERLIN, OHIO.

JACK FOR MOTOR-DRIVEN VEHICLES.

1,382,250. Specification of Letters Patent. Patented June 21, 1921.

Application filed December 27, 1920. Serial No. 433,253.

*To all whom it may concern:*

Be it known that I, EDWARD M. SCOTT, residing at Oberlin, in the county of Lorain and State of Ohio, a citizen of the United States, have invented certain new and useful Improvements in Jacks for Motor-Driven Vehicles; and I do hereby declare the following to be a full, clear, and exact description of the invention, such as will enable others skilled in the art to which it pertains to make and use the same.

My invention relates to an improvement in vehicle jacks and more particularly to a jack to be used in connection with an automobile or similar motor driven vehicle.

The object of the invention is to provide a jack for the purpose of elevating a vehicle and the wheels thereof to remove the weight of the vehicle from the tires when the vehicle is in storage, when it is desired to elevate one or more of the wheels in order to facilitate repairs to a tire or replace it by a new tire or for any other purpose.

A further object is to provide a jack permanently secured to a vehicle and forming a built-in or integral part thereof.

A further object is to provide a jack of the character described which is capable of being actuated or operated by means of the motor of an automobile or other motor driven vehicle and which is under the complete control of the operator of such vehicle at all times.

A further object is to provide means for preventing the unauthorized use or operation of an automobile by temporarily disconnecting some of the operative parts thereof.

A still further object is to provide a jack which is exceedingly simple, inexpensive and durable in construction, easy in operation and effective in results.

The invention consists in the several features and in the construction, combination and arrangement of such features as is more fully hereinafter described and claimed.

Referring to the drawings:—

Figure 1 is a plan view of my invention applied to an automobile of conventional type.

Fig. 2 is a vertical transverse sectional view on the plane indicated by the line 2—2 of Fig. 1.

Fig. 3 is an enlarged detail sectional view of one of the jack elements or units, the plane of the section being the same as that of Fig. 2.

Fig. 4 is an enlarged detail sectional view of the upper portion of one of the jack screws.

Figs. 5 and 6 are transverse detail sectional views on the planes indicated respectively by the lines 5—5 and 6—6 of Fig. 3.

Fig. 7 is a horizontal sectional view on the plane indicated by the line 7—7 of Fig. 2.

Fig. 8 is a detail sectional view on the plane indicated by the line 8—8 of Fig. 1.

Fig. 9 is a detail sectional view on the plane indicated by the line 9—9 of Fig. 1.

Figs. 10 and 11 are detail edge and side views respectively of a hanger for the transmission shaft by which jack operating motion is communicated from the rear counter shaft to the front counter shaft.

Fig. 12 is a detail view partly in section of the controlling lever and connection.

Fig. 13 is a detail sectional view on the plane indicated by the line 13—13 of Fig. 12.

Fig. 14 is a detail sectional view on the plane indicated by the line 14—14 of Fig. 12.

In the drawings, in which like reference characters denote like parts throughout the several views, 9 represents an automobile of conventional well known type, 10 the longitudinally extending drive shaft mounted in the usual manner and extended from the transmission gearing, the casing for same being shown at 11. The transmission gearing being preferably actuated by means of a shift gear lever 12 or any preferred equivalent thereof, as in the ordinary practice, and movably mounted upon and keyed to said drive shaft is a pinion 13 for movement into and out of engagement with a drive gear 14 located in the differential gear casing 15, said pinion 13 being of the double type as shown clearly in Fig. 7 and adapted for alternative engagement with said drive gear 14 and bevel pinions 16 which are carried respectively by the independently revoluble members 17 of a transverse countershaft of which a duplicate 18 may be arranged at the front of the machine as shown in Fig. 1, the front counter shaft for example receiving motion from the rear counter shaft through a longitudinally disposed transmission shaft 19 having terminal rear and front pinions 20 and 21 meshing respectively with pinions 22 and 23 on said counter shaft. The transmission shaft may be yieldingly supported from the frame or chassis at an intermediate point by means of a hanger bearing indicated in Fig. 1 at 24 and shown in detail in Figs. 10 and 11, the bearing sleeve 25 being carried by a stem 26 having a cross head 27 arranged in depending guides 28 and yieldingly held in place by cushioning springs 29 and 30 arranged respectively above and below the cross head. The transmission shaft also is preferably provided at an intermediate point with a universal joint 31.

When the drive pinion 13 is in engagement with the drive gear 14, motion may be communicated to the driving wheels of the vehicle, shown in Fig. 1 at 32, in the ordinary way through the axle shaft indicated in dotted lines at 33, and while said pinion is adapted to occupy a neutral position, out of engagement with said drive gear and also out of engagement with the pinions 16, so as to prevent the propulsion of the car and thus serve as a means of locking the same against surreptitious removal or operation, the engagement of the pinion 13 with the pinions 16 provides for communication of rotary motion to the members of the counter-shaft 17 which at their outer extremities carry the bevel pinions 34 adapted to mesh with gears 35 which are provided with interior threads, as shown in detail in Fig. 3, to constitute feed nuts for engagement with the threaded stems or feed screws 36 of the lifting jack units or members, one of which is located adjacent to each wheel of the car,—that is one adjacent to each end of the rear axle and one at each end of the front axle as indicated clearly in Fig. 1 of the drawings.

These jack screws respectively are mounted on bases 37 adapted to be placed in contact with the ground or surface by which the automobile or like vehicle is supported, and extending upward therefrom are the guide rods 38 extending through suitable guides 39 on the frame of the car, to permit of vertical movement of the bases while preventing rotation thereof with the feed screws, or lateral displacement by reason of the operation of said feed screws.

The pinions 34 are preferably keyed as at 40 to the counter shaft to provide for their movement into and out of engagement with the feed nuts 35, and independent adjustment of said pinions may be effected by means of bell crank levers 41 connected by rods 42 with suitable hand levers 43 located conveniently near the driver's station or seat of the car or vehicle. Obviously either feed nut 35 may thus be geared to its respective member of the counter-shaft, and both members of the counter-shaft may be operated by the engagement of the double pinion 13 with the pinions 16 located at the inner ends of said members of the counter-shaft, to the end that the entire rear portion of the vehicle may be elevated, or by the manipulation of one of the hand levers 43, either of the feed nuts may be released by disengaging the related pinion 34 therefrom, so that only one feed nut may be operated to raise a single wheel of the vehicle, or that end of the axle which carries a wheel requiring repair or the replacement of a tire.

The feed screw 36 of the jack stem is provided with independently revoluble or idle sections 44 and 45 located respectively at the upper and lower ends of the fixed portion of the feed screw and consisting of sleeves which are adapted when the feed nut engages the same to turn therewith so as to limit the upward and downward movement of the jack members or units to prevent the depression thereof beyond a certain limit or the elevation thereof beyond that which is necessary to completely withdraw the base portion of the jack from the ground and house the body portion of the same in suitable inconspicuous relation with the body of the car, ready for extension at any time to perform the functions for which they are designed, merely by the manipulation of means by which motion may be communicated thereto from the drive shaft of the vehicle. The loose or idle screw sections may be locked against movement in one direction to enable the feed nut to pass therefrom to the stationary portion of the screw by means of ratchets, consisting in the construction illustrated of dogs 46 (see Figs. 5 and 6), for engagement with ratchet teeth or seats 47 (see also Fig. 4), the disposition of the elements being such that when the dogs engage the teeth the threads of the loose feed screw sections will be in registration with those of the fixed section so that the nuts may pass freely one to the other. The ratchets of the sleeves 44 and 45 are arranged to operate in reverse directions, so that with the feed nut engaged with the upper sleeve 44 the rotation of the former tending to raise the feed screw will cause the locking of the sleeve, and with the feed nut engaged with the lower sleeve, the rotation thereof tending to extend the feed screw will cause the locking thereof. With the feed nut turning in the direction necessary to extend the feed screw, the engagement thereof with the threads of the sleeve 44 at the upper end of the fixed portion of the feed screw will cause the said sleeve to rotate with the nut and thus discontinue the downward or extension movement of the feed screw.

The beveled gears 16 which are carried by the inner ends of the members of the counter shaft 17 are also keyed as indicated at 48 to said shaft members to the end that either or both of them may be brought into engagement with the double pinion 13 when the latter is disengaged from the drive gear 14 and is in the path of movement of the said gears 16, and in order to effect the movement of the pinion 13 and of said gears 16 there is provided a tubular rock shaft 49 having a cross head 50 of which the arms are connected by shifting arms 51 with the grooved hubs 52 of said gears 16 (see Fig. 2) and a stem 53 extending through said tubular rock shaft and provided at its rear end with an arm 54 engaged with the grooved hub or sleeve 55 of the pinion 13. Preferably these elements, namely the rock shaft and stem, are provided with universal joints indicated at 56 to compensate for relative movement of the chassis and body of the car, said members being connected with the elements of a controlling lever indicated at 57 which is preferably arranged within convenient reach of the driver, as indicated in Fig. 1.

The controlling lever consists of a hand lever 58 (see particularly Figs. 12, 13 and 14) having a locking pawl or dog 59 for engagement with a toothed segment 60 and carrying a pin 61 engaged with a transverse guide loop 62 at the front end of the stem 53. Carried by the forward end of the rock shaft 49 is a crank arm 63 extending through an opening 64 in the hand lever, so that by longitudinal swinging movement of the hand lever parallel with the plane of the toothed segment 60 the stem 53 may be longitudinally shifted to cause the shifting of the pinion 13 into and out of engagement either with the drive gear 14 or the gears 16, provided the latter are positioned in the path of movement of said pinion, while by the lateral swinging movement of the hand lever, to thus actuate the crank arm 63, the rock shaft 49 may be turned to cause either the inward or outward shifting of the gears 16 upon the member of the counter shaft 17 to effect engagement or disengagement thereof with relation to the pinion 13. To allow for the lateral swinging movement of the hand lever the segment 60 may be mounted for oscillatory movement by means of a rocker 65 which is indicated in Fig. 14.

By the proper adjustment of the elements as indicated it will be obvious that either of the wheels of the car may be elevated to permit of the repair thereof or the replacement of a tire, or either end of the car may be raised to give access to both the front wheels or both the back wheels, or the entire car may be elevated to relieve all of the tires of the weight of the vehicle, as when the same is stored or arranged in the garage for a protracted period. Moreover by disconnecting the driving pinion 13 from the drive gear 14, the gears 16 being allowed to remain in their separated position, and locking the hand lever 58 in a position as by means of a suitable pad lock not shown, the surreptitious or unauthorized driving of the car may be prevented.

It will be understood that an important advantage of the apparatus described resides in the fact that being mounted directly upon the vehicle it is not open to the objection of independent jacks operating from the ground in that it is not necessary to fully expand or stretch the springs in order to raise the wheels from the ground and as above indicated a single wheel may be raised if desired while the others are permitted to retain their position upon the ground.

Moreover it will be understood that any suitable anti-friction bearings such as ball bearings may be used at points exposed to friction such as the mounting of the feed nuts upon the feed screws or jacks 10, to minimize the power necessary and reduce friction in the operation of the mechanism.

I do not wish to be understood as limiting myself to the specific details of construction and arrangement as herein described and illustrated, as it is manifest that variations and modifications may be made in the features of construction and arrangement, in the adaptation of the device to various conditions of use, without departing from the spirit and scope of my invention and improvements. I therefore reserve the right to all such variations and modifications as properly fall within the scope of my invention and the terms of the following claims.

What I claim is:—

1. In a jack for motor driven vehicles, a jack member having a screwthreaded stem, with a plurality of idle rotatable sections, rotatable means mounted on said stem and engaging the screwthreads of the idle rotatable sections thereof and means for operatively connecting the drive shaft of a vehicle with said rotatable means.

2. In a jack for motor driven vehicles, a jack member having screwthreads, rotatable means engaging said screwthreads, means for operatively connecting the drive shaft of a vehicle with said rotatable means and idle rotatable threaded sections for engagement by the rotatable means and means for supporting said jack member.

3. In a jack for motor driven vehicles, a jack member having a screwthreaded stem provided at its lower end with supporting means adapted to contact with the ground, rotatable means on said screwthreaded stem, means for operatively connecting the drive shaft of a vehicle with said rotatable means, idle rotatable threaded sections on said stem adapted for engagement by the rotatable means and ratchet means for locking said idle rotatable means against rotary movement in one direction.

4. In a jack for motor driven vehicles, a jack adjacent each wheel of the vehicle, each jack having a stem with a plurality of idle screwthreaded sleeves, a rotatable gear for engagement with the screwthreads of said sleeves and independently operable means for operatively connecting each of said rotatable gears with the drive shaft of a vehicle.

5. In a jack for motor driven vehicles, jack members adjacent the vehicle wheels and each provided with a screwthreaded stem having a plurality of independently rotatable sections, a rotatable gear engaging said stem and sections, counter-shafts located at the front and rear ends of the vehicle and having gear connections with the rotatable gears, means for operatively connecting the rear counter-shaft with the front counter-shaft, a pinion shiftably mounted upon the vehicle drive shaft for communicating motion to the rear counter-shaft and independent means for coupling each rotatable gear with its related counter-shaft.

6. In a jack for motor driven vehicles, jack members having a feed screw provided with independently rotatable idle sections at the upper and lower ends of the fixed portion of the feed screw and consisting of sleeves, a feed nut or gear adapted to engage said sleeves and turn therewith and limit the upward and downward movement of the jack members, and means for locking the independently rotatable idle sections against movement in one direction to enable the feed nut to pass therefrom to the stationary portion of the said feed screw.

7. In a jack for motor driven vehicles, jack members provided with a screwthreaded stem consisting of a main section and rotatable idle sections at the upper and lower ends of said main section, a feed nut or gear engaging the screwthreads of the stem and means for operatively connecting the feed nut or gear with the drive shaft of a motor vehicle.

8. In a jack for motor driven vehicles, jack members having a plurality of independently rotatable screwthreaded sections, means for supporting said jack members, a feed nut or gear adapted to engage said plurality of sections and means for operatively connecting the said feed nut or gear with the drive shaft of a motor vehicle.

9. In a jack for motor driven vehicles, jack members having a plurality of independently screwthreaded sections, means for supporting said jack members, means for guiding the vertical movement of said jack members, a feed nut or gear adapted to engage said plurality of sections and means for connecting the said feed nut or gear with the drive shaft of a motor vehicle.

In testimony whereof I have affixed my signature.

EDWARD M. SCOTT.